Nov. 19, 1968   TAKESHI ODASHIMA   3,412,357
CONDITION RESPONSIVE SWITCH
Filed Jan. 17, 1968   2 Sheets-Sheet 1

INVENTOR.
TAKESHI ODASHIMA
BY McGlew and Toren
Attorneys

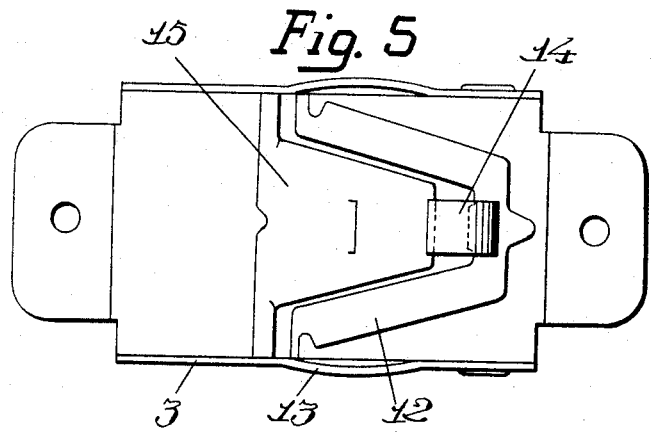
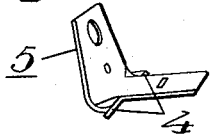
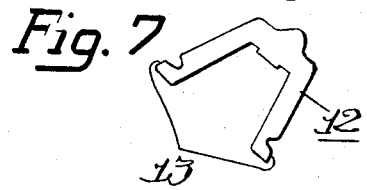
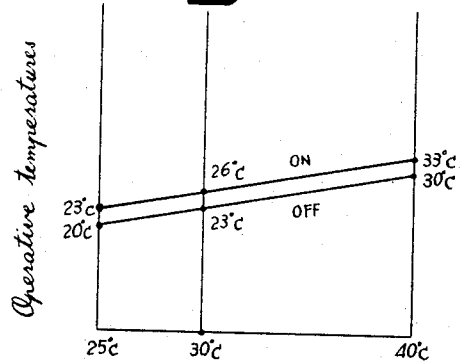
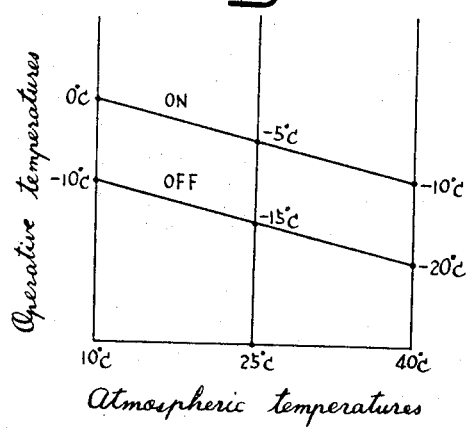
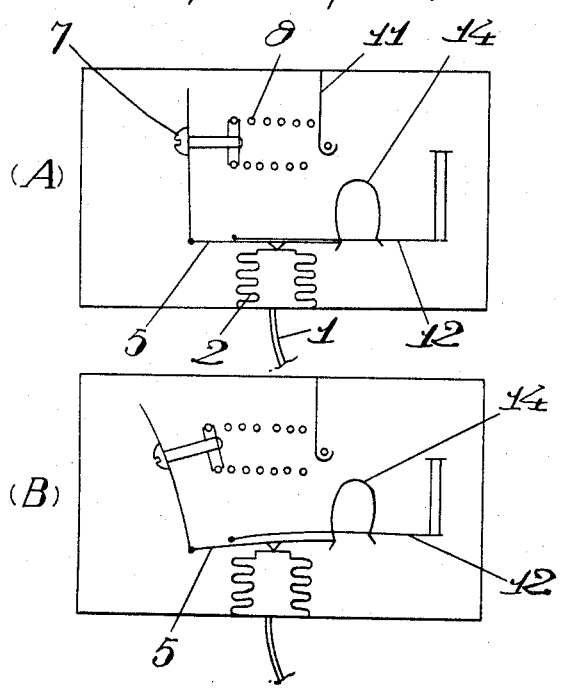
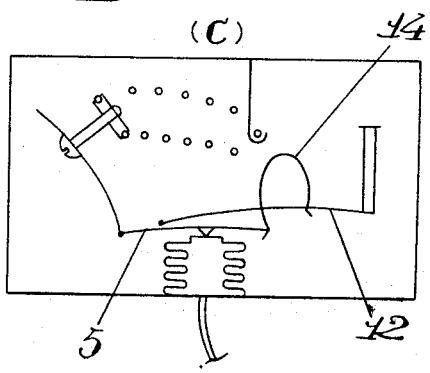
INVENTOR.
TAKESHI ODASHIMA 3,412,357
Patented Nov. 19, 1968

3,412,357
CONDITION RESPONSIVE SWITCH
Takeshi Odashima, Tokorozawa, Japan, assignor to Kabushiki-Kaisha, Saginomiya, Seisakusho, Tokyo, Japan
Filed Jan. 17, 1968, Ser. No. 698,642
Claims priority, application Japan, Jan. 24, 1967, 42/4,311
1 Claim. (Cl. 337—300)

ABSTRACT OF THE DISCLOSURE

A condition responsive switch in which operating plates are made of bimetallic plates and exposed to the ambient atomosphere, so that the acting point of the switch may vary in proportional relation to variation of the atmospheric temperature. A range of operative temperatures of the switch is not only manually pre-adjustable but also automatically varied depending upon expansion or bending of said bimetallic plates.

---

The present invention relates to an automatic switch, more particularly to a snap-action condition responsive switch of the type as disclosed in the U.S. Patent No. 3,185,796, with the invention of which the inventor of the present invention is imparted as one of co-inventors.

In a switch having a conventional sensitive tube including such a switch as disclosed in the aforementioned U.S. Patent No. 3,185,796, the operative temperature of the switch has been maintained in a given or predetermined temperature by manually varying tension of a spring provided in the thermostat mechanism. However, it is practically impossible to usually make a manual adjustment of the switch for a wide range of operative temperatures thereof in response to variable temperatures of the atmosphere; for example, in case the switch is used with an air conditioning apparatus, tension of said spring of the switch must be manually adjusted for making a room temperature elevated in proportion to rise of outdoor temperature, in order that difference between indoor and outdoor temperatures does not give bad influence to health.

Accordingly, the object of the present invention is to provide a condition responsive switch which can be automatically adjusted for a wide range of operative temperatures according to variation of temperatures of ambient atmospheres.

Figure 1:
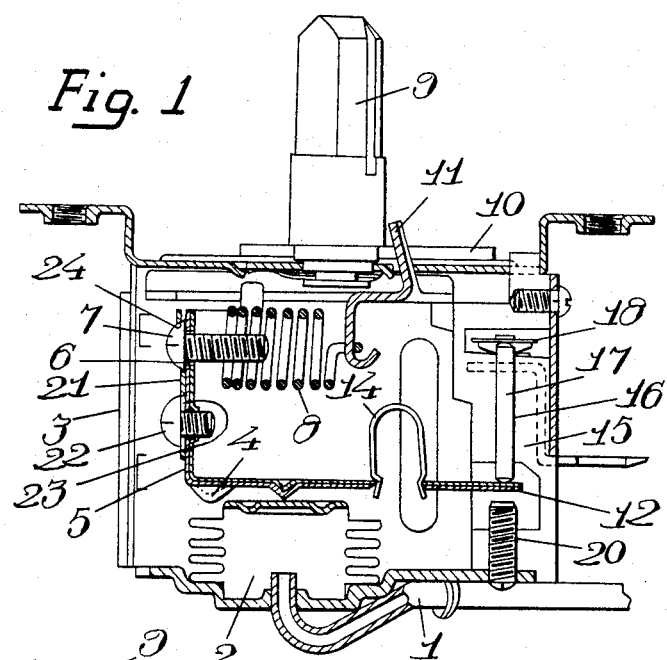
Figure 2:
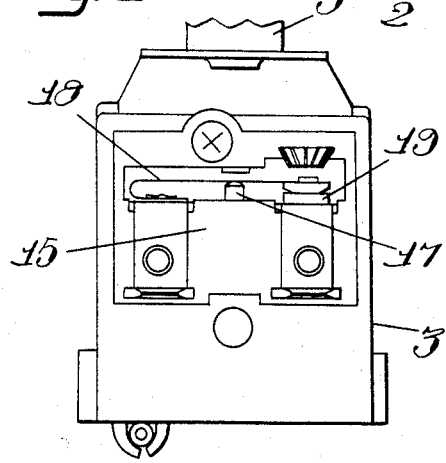
Figure 3:
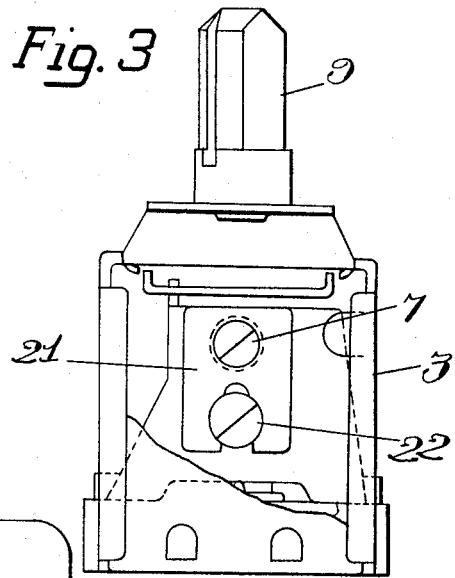
Figure 4:
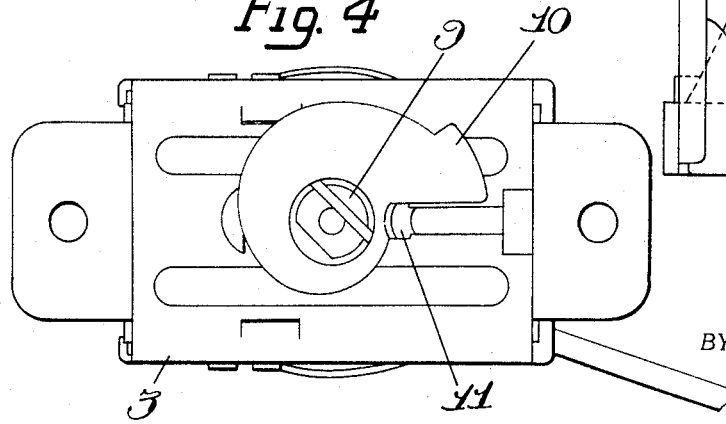

In accompanying drawings showing a preferred embodiment of a condition responsive switch of the present invention;

FIG. 1 is a vertically sectioned side view;
FIG. 2 is a right side view;
FIG. 3 is a left side view;
FIG. 4 is a plan view;
FIG. 5 is a plan view of an operating plate part;
FIG. 6 is a perspective view of the first operating plate;
FIG. 7 is a plan view of the second operating plate;
FIG. 8 is a diagram showing elevation of operative temperatures of the switch used with a window-cooler, shown in relation to atmospheric temperatures;
FIG. 9 is a diagram showing operative temperatures of the switch used with a refrigerator, shown in relation to variation of outer temperatures thereof; and
FIG. 10, A, B and C are explanatory views showing operation of operating plates of the switch used with a window-cooler.

In explaining in details the switch of the present invention with reference to drawings; in which numeral 1 is a sensitive tube part enclosing a temperature sensitive fluid and being connected at one end with a bellows. Said bellows has the upper end in contact with a point of a horizontal side part of a first operating plate or lever 5 of L-shaped in side elevation and rotatably supported on fulcrum bearings 4 formed on a frame 3. Engraved on the vertical side part of the operating plate 5 is a slot 6, into which a machine screw 7 is freely inserted and screwed into a threaded aperture part connected with one end of a coil spring 8. This spring 8 is connected at its other end with an adjusting plate 11 operatively connected with a spiral cam plate 10 fixed to a rotary shaft 11.

A second operating plate or lever 12 of a forked shape is supported rotatably on fulcrum bearings 13 formed on the frame 3 and operatively connected with said first operating plate 5 through a leaf or toggle spring 14 of an inverted U-shaped as clearly shown in FIG. 1. Both of said first and second operating plates 5 and 12 are of bimetallic. The second operating plate 12 is in contact at one end with the lower end of a vertical rod 17 slidably fitting to a vertical hole 16 in a terminal block 15 fixed to one side of the instrument case. Said vertical rod 17 is in contact at its upper end with a movable spring contact arm 18 and positioned to make and break contact with a fixed contact 19. 20 is a bolt for adjusting the vertical range of movement of the second operating plate 12 and is to adjust the temperature difference or pressure difference for opening and closing the contacts. 21 is a resilient plate secured by a screw 22 to the vertical side of the first operating plate 5 and having a slot 23 and a small hole 24 pressing the head of the bolt 7 on which the coil spring 8 is hung.

In explaining operation of the switch of the invention, when the gas pressure within the sensitive tube 1 rises with the rise of the atmospheric temperature, the bellows 2 is expanded, and therefore the first operating plate 5 will be pivoted, counterclockwise as viewed upon FIG. 1, about fulcrum bearings 4 against tension of the spring 8. Therefore, the second operating plate 12 in operative connection with the first operating plate 5 through the inverted U-shaped leaf spring 14 will rotate with a snap action, clockwise about its fulcrum bearings 13. With rotation of said second operating plate 12, the vertical rod 17 in contact with one end of said plate and inserted into the vertical hole 16 in the terminal block 15 will fall and the movable contact 18 which has been in contact with the upper end of the vertical rod 17 will come into contact with the fixed contact 19. When the gas pressure within the sensitive tube 1 decreases, an operation reverse to the above description will take place. That is to say, when the tension of the coil spring 8 becomes stronger than the gas pressure pressing the bellows, the first operating plate 5 will rotate clockwise in FIG. 1, and then the second operating plate 12 will rotate quickly anticlockwise. Therefore, the vertical rod 17 in contact with one end of the second operating plate 12 will rise and the upper end thereof will push the movable contact plate 18 upwardly to make said plate out of contact with the fixed contact plate 19, so as to open the electric circuit.

The temperature range of the switch of the present invention is adjusted by first varying the tension of the coil spring 8 which is used as a counter power against the gas pressure, meanwhile the temperature difference or pressure difference for opening and closing contacts is adjusted by vertical movement of the adjusting bolt 20 screwed in the lower part of the terminal block 15.

In air cooling of a room in summer, if the room temperature is too much lowered in comparison with rising temperature of the outdoor atmosphere, it will badly affect health. In the view point of making healthy air cooling, there is a requirement for elevating a room temperature in proportion to rise of outdoor atmospheric temperature. For this purpose, the switch used with the air-cooling apparatus may be adjusted for rising operative temperatures with rise of the outdoor temperature as shown in FIG. 8.

Further, the switch of the present invention used with a refrigerator may be adjusted for lowering temperature of an evaporator when outside temperature of the refrigerator rises, thereby maintaining the inside of the refrigerator in a constant temperature, in spite of rising temperature outside of the refrigerator. That is to say, the switch may be adjusted for lowering operative temperatures thereof in inverse proportion to rise of the outside temperature of the refrigerator as shown in FIG. 9.

Conventionally, such adjustment of a range of operative temperatures of the switch has been effected manually by pivoting the spiral cam plate 10 fixed to the rotary shaft 11 for varying the tension of the coil spring 8. According to the present invention, the bimetallic first and second operating plates 5, 12 of the switch are exposed to the ambient atmosphere, so that the acting point of the switch may vary in proportional relation to variation of the atmospheric temperature. A range of operative temperatures of the switch is not only manually adjusted but also automatically varied depending upon expansion or bending of said bimetallic operating plates 5, 12.

Accordingly, the switch of the present invention is to be mounted to such positions that the main body of the switch can be responsive or sensitive to temperature of the ambient atmosphere. In some case, if the adjusting plate 11 is fixed to the frame 3 instead of employing the cam device, adjustment of operative temperatures is automatically effected only by bimetallic first and second operating plates 5, 12.

In explaining modes of operation of bimetallic operating plates 5, 12 as a responsive device of atmospheric temperature of the switch used with a window-cooler with reference to FIG. 10, bimetallic operating plates 5, 12 are formed rectilinearly at the temperature of 25° C. as shown in FIG. 10, A. In this drawing, the first operating plate 5 and the second operating plate 12 are on the eve of the ON position. A range of operative temperatures in this case is adjusted so that the switch may be put in ON position at 23° C. and in OFF position at 20° C.

When the atmospheric temperature rises to 30° C. in FIG. 10, B, the second operating plate 12 becomes curved to rise the acting point of the switch, thereby elevating a range of operative temperatures of the switch. That is to say, the switch is put into ON position at 26° C. and into OFF position at 23° C. When the atmospheric temperature rises to 40° C. in FIG. 10, C, the second operating plate 12 becomes further bent to rise the acting point of the switch and a range of operative temperatures. The switch in this case is put into ON position at 33° C. and OFF position at 30° C.

In the switch used with the window-cooler as disclosed in the above, the inside part of the first operating plate 5 and the upper side of the second operating plate 12 respectively serve as highly expandable bimetallic sides, meanwhile opposite side of these operating plates of the switch used with a refrigerator are for high expansion.

What is claimed is:

1. In a condition responsive switch comprising first and second levers, first means mounting said levers in normally co-planar relation for independent pivotal movement about respective adjacent first and second parallel axes in the common plane thereof, said levers including respective first and second confronting adjacent abutments in said plane and offset from said axes, a toggle spring interposed between and engaging said abutments to exert a force normally in said plane and urging said abutments apart, second means engaging said first lever in offset relation with said first axis and effective to pivot said first lever in one direction, by and in response to a change in pressure, spring means connected with said first lever and urging the same into pivotal movement in the opposite direction, and contact closing means responsive to pivoting of said second lever about said second axis; the first and second levers being respectively made of a bimetallic plate and responsive to an ambient temperature giving the corresponding pivoting to the second lever for actuating the contact closing means in response to a change in the temperature.

References Cited

UNITED STATES PATENTS

| | | | |
|---|---|---|---|
| 1,916,669 | 4/1933 | Kuhn et al. | 200—138.6 |
| 2,405,767 | 8/1946 | Sprague | 200—138.6 |
| 2,762,888 | 9/1956 | Jacobs | 200—140 |
| 2,853,583 | 9/1958 | Rauh | 200—140 |
| 3,187,136 | 6/1965 | Corder et al. | 200—140 |
| 3,185,796 | 5/1965 | Mamiya et al. | 200—140 |

BERNARD A. GILHEANY, *Primary Examiner.*

H. B. GILSON, *Assistant Examiner.*